United States Patent Office 3,125,537
Patented Mar. 17, 1964

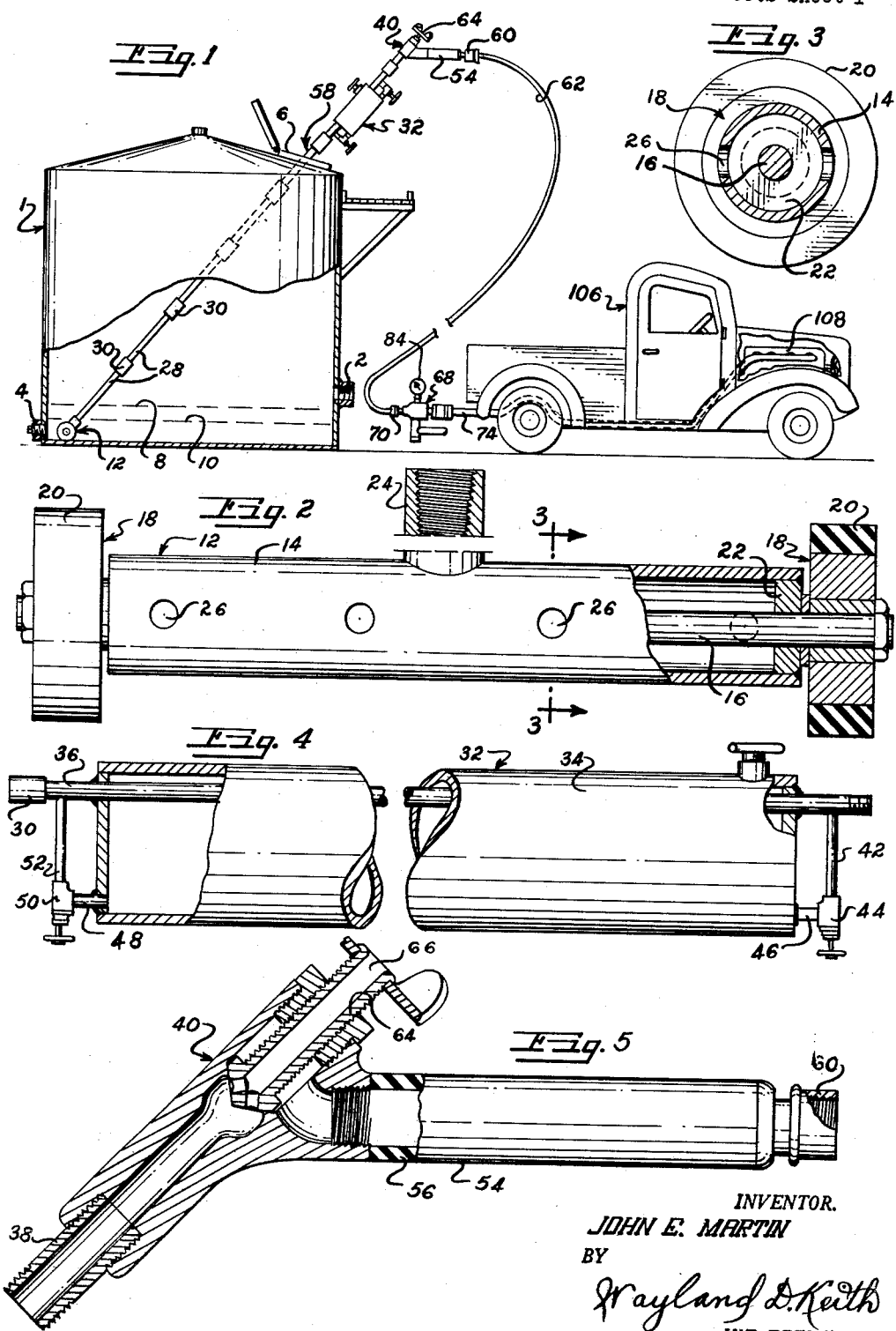

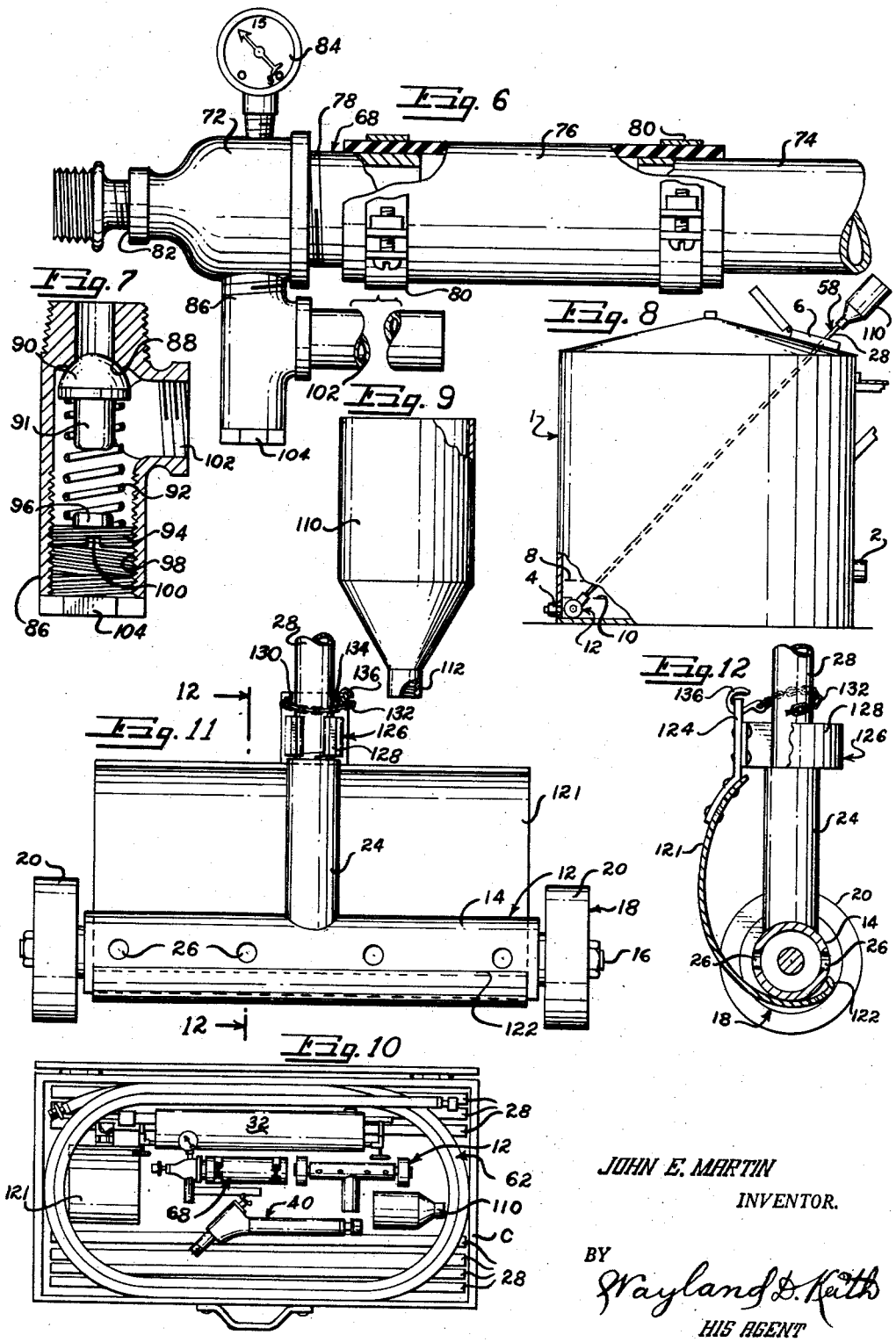

3,125,537
APPARATUS FOR TREATING CRUDE OIL EMULSIONS WITHIN A TANK
John E. Martin, Wichita Falls, Tex., assignor to Marmac Chemical Corporation, Wichita Falls, Tex., a corporation of Texas
Filed Feb. 14, 1961, Ser. No. 89,180
7 Claims. (Cl. 252—359)

This invention relates to agitators, and more particularly to agitators for agitating oil in storage tanks, so as to enable the removal of water therefrom, and the breaking down of bottom settlings, whereby good oil can be reclaimed from the bottom settlings, which would otherwise be wasted.

Various methods of agitating bottom settlings have been proposed heretofore, but these, for the most part, required considerable mechanism, or required considerable labor, if manual methods of agitating the oil was employed.

If the bottom settlings in the oil are not rolled or mixed to cause the separation of the good, marketable oil from the bottom settlings, much marketable oil may be drained off through a drain outlet in the tank which is a spaced distance below the "pipe line" connection. Therefore, irreplaceable natural resources are wasted, as is oil which could be sold for a cash return.

Practically all crude oil produced from the earth strata has more or less foreign matter therein, such as mud, sand, water, gas, and the like, and when produced, some of these elements, together with a special element present in some oil, such as paraffin, go to make up emulsions, some of which are particularly difficult to de-emulsify, so they can be removed from the crude oil. Emulsions which settle to the bottom of the tank are known as bottom settlings. Some of these mixtures will remain stable emulsions over long periods of time at relatively low temperature, but at higher temperatures these emulsions will break down so that foreign elements of heavier gravity than oil will settle to the bottom of the tank to enable these to be drained from the tank by a conventional drain therein, and the oil and gas which are separated from the bottom settlings move upward into the oil so that the oil may be maintained at a quality acceptable for purchase by the crude oil purchasing companies. If the crude oil tested has more than a certain percent of foreign substance known as bottom settlings therein, the crude oil is unacceptable for marketing for these elements must be removed from the oil before the crude oil purchasing company will purchase the oil.

It is particularly desirable to remove as much of the bottoms settlings from the oil as possible as the price of oil is based upon the gravity and cleanliness thereof. To accomplish further cleaning of the oil, it is often desirable to add chemicals to the oil, which chemicals are preferably added directly into these emulsions thereby enabling a minimum of chemical to be used to produce the maximum breakdown of the emulsion or bottom settling in the tank. However, the adding of chemicals alone is insufficient as they will treat only the portion of the oil with which the chemical comes in contact; therefore it is desirable to agitate or "roll" the emulsions or bottoms settlings to thoroughly mix the chemical with the bottom settlings. Furthermore, the emulsions and bottom settlings are more readily broken down and separated into their respective components by adding heat thereto, if the heat is controlled so as to be within a safe temperature to prevent conflagration of the oil in the tank.

If the bottom settlings and emulsions are correctly agitated or "rolled" and heat to the correct degree is applied, these bottom settlings will become readily broken down with the respective constituents seeking their level in accordance with their gravity.

The present device enables the bottom settlings or emulsions to be quickly and completely agitated and emulsion breaking chemicals mixed therewith simultaneously with the application of heat by aerating the emulsion with a heated gas, so that the oil can be simultaneously treated by three distinct methods to enable the entire operation to be completed in a few minutes time, which would take considerably longer by manual or mechanical methods and without the benefits by the three methods being used simultaneously.

The present device preferably utilizes the hot exhaust gas from an internal combustion engine such as a car, truck or the like, which gas is directed through a conduit system to the lower portion of the tank whereby the hot gas is discharged outward through an elongated spreader so that the gas discharging therefrom will heat the oil and at the same time simultaneously agitate the emulsions as the hot gases are discharged from a perforated spreader. Furthermore, when desired, a chemical can be added through the conduit to the bottom of the tank to admix with the bottom settlings and emulsions, either prior to or during the agitation of the bottom settlings. Furthermore, the conduit that extends into the tank is of a rigid type and may be moved across the entire bottom of the tank as the hot gases are being discharged from the perforated spreader on the lower end thereof, thereby not only treating the bottom settlings but causing a rolling action of the bottom settlings upward so as to thin these with "live" crude oil, which will cause considerable good oil to be given up by the emulsion. Furthermore, the heated gas will pass upward through the oil that is stratified above the bottom settlings, which will cause water and other constituents, which are suspended in the oil that are of a heavier gravity than the oil to be heated and agitated so that upon the cessation of the agitation or rolling of the oil, the heavier gravity elements that were suspended in the oil will readily settle out and stratify in the bottom of the tank so these may be drained off by the drain-off connection at the extreme lower portion of the tank.

The present device is relatively inexpensive to manufacture and operate and requires a minimum of physical effort to secure maximum results.

An object of this invention is to provide a device which will agitate the emulsions and bottom settlings in a crude oil tank to enable the breaking down of the emulsions so as to procure the maximum marketable crude oil therefrom.

Another object of the invention is to provide a gas actuated mixing device for agitating, heating, and treating emulsions in tanks containing crude oil with emulsion breaking chemicals to enable the poducing of marketable crude oil from at least a portion of the bottom settlings and emulsions.

A further object of the invention is to provide a portable crude oil agitating device which may be carried from tank to tank for the treating of the bottom settlings and crude oil in the tank by heated gases, so as to break down the emulsions in the oil in the tank.

A still further object of the invention is to provide a crude oil treating method which employs heated gas from an internal combustion engine to agitate and break down emulsions and bottom settlings present in crude oil within a tank.

Still another object of the invention is to provide a chemical dispensing device which will dispense emulsion breaking chemical selectively to the bottom of a tank containing crude oil.

Still a further object of the invention is to provide a method of treating crude oil in a tank by simultaneously agitating the oil, by heating the oil, and by introducing an emulsion breaking chemical into the oil.

Yet another object of the invention is to provide a gas actuated agitating means for agitating bottom settlings and emulsions in crude oil storage tanks, which agitating means has a curved plate attached thereto to divert the gas being discharged from the agitating means in a direction to move the bottom settlings in one direction.

With these objects in mind and others which will become manifest as the description proceeds, reference is to be had to the accompanying drawings in which like reference characters designate like parts in the several views thereof, in which:

FIG. 1 is a side elevational view showing a crude oil tank with parts broken away and showing the agitator device embodied in the present invention positioned within the tank and extending outward through an opening in the top of the tank, and showing an emulsion breaking chemical dispenser attached thereto with a flexible conduit extending from the exhaust pipe of a motor vehicle to the conduit leading to and through the chemical dispenser;

FIG. 2 is an enlarged view of a perforated spreader positioned on the lower end of the rigid conduit extending into the tank, and showing portions thereof broken away and in section to show the details of construction;

FIG. 3 is a sectional view taken on the line 3—3 of FIG. 2 looking in the direction indicated by the arrows;

FIG. 4 is an enlarged elevational view of an emulsion breaking chemical dispenser with parts broken away and shown in section to bring out the details of construction;

FIG. 5 is an elevational view of the control valve for controlling the entrance of hot gas into the conduit leading to the bottom of the tank;

FIG. 6 is an enlarged view of the exhaust pipe attachment device, showing parts thereof broken away and parts being shown in section, to bring out the details of construction;

FIG. 7 is an enlarged, detailed sectional view through the relief valve for by-passing exhaust gases, certain parts being shown in elevation;

FIG. 8 is an elevational view of a modified method of introducing chemicals into the bottom of a tank;

FIG. 9 is an enlarged view of the funnel type device used for introducing chemicals into the bottom of the tank with the device shown in FIG. 8, showing portions broken away and portions being shown in section;

FIG. 10 is a plan view of an open carrying case, showing the various pieces of emulsion agitating apparatus therein;

FIG. 11 is an elevational view of the spreader mechanism, showing a curved paddle plate attached thereto; and FIG. 12 is a sectional view taken on the line 12—12 of FIG. 11, looking in the direction indicated by the arrows.

With more detailed reference to the drawings, the numeral 1 designates generally an oil storage tank having a pipe line connection 2 and a drain connection 4 therein. The tank 1 has an opening 6 formed in the top thereof which is of a size used by gaugers for lowering into the tank sampling devices to recover oil samples therefrom. The opening in the top is known in the art as a thief-hole, which has a lid or hatch thereover for normally retaining the tank in substantially gas tight condition.

The pipe line connection 2 is usually disposed some twelve inches or more above the bottom of the tank so as to permit emulsions, sand, mud, and water and other elements of heavier density than oil to settle to the bottom of the tank. However, as the top of the emulsions or interface of the emulsions and/or water approaches the pipe line connection the quality of the pipe line oil passing out through the connection 2 is endangered; therefore the emulsion line indicated at 8 must be maintained a specified distance below the pipe line connection 2. However, in some oils a sharp interface between the oil and the emulsion does not exist, but is of a gradation from heavy emulsion at the lower side to marketable quality crude oil at a higher level, and by lowering a thief on a measuring line into the tank by a pipe line gauger, the level and density of the oil and oil mixed emulsion can be determined. Therefore, if this emulsion at a predetermined distance below the pipe line connection has emulsions or water therein, the grade of the crude oil is lowered as is the price and if the crude oil at this point contains more than a given percent of bottom settlings and water, the crude oil purchasing company, which is usually termed the pipe line company, may refuse to buy the oil until it has been properly treated and cleaned.

Some oil produces free water that has not been separated out by a separator through which the oil is passed before passing into the crude oil storage tank 1. The water, as indicated at 10, may be drained off through the drain connection 4 until bottom settlings begin to appear whereupon the emulsions 8 within the crude oil need to be treated to reduce these to a minimum, so as to raise the quality of the oil, as well as the volume of marketable crude oil, thereby enabling water and the heavier solids 10 to settle out to be drained out through drain connection 4. In so doing the level of the emulsion 8 will be lowered a sufficient distance below the pipe line connection 2 to render the oil purchasable.

Various methods of mechanical agitation, and also manual agitation by boards or paddles have been practiced heretofore; however, the mechanical equipment to mechanically agitate the tanks was expensive, and the system of using a board or paddle was laborious, and lease operating personnel, known as roustabouts would often shirk their responsibility of thoroughly agitating the oil and bottom settlings, when chemical had been added. Therefore, the oil was down graded, with a financial loss to the producer.

In the present device, the spreader is designated generally by the numeral 12, and is composed of a tubular member 14, which has an axial shaft 16 therethrough, on which shaft wheels 18 are mounted. The wheels 18 are preferably made of copper and have rubber tires 20 thereon, to minimize the possibility of sparks. The tubular member 14 is preferably of copper, or other non-sparking metal or plastic, and has the ends thereof closed, as by plugs 22. The plugs each have an axial opening therein to tightly receive shaft 16 therethrough, as will best be seen in FIG. 2. The tubular member 14 has a pipe connection 24 mediate the ends thereof, which pipe connection is in communication with the opening within tubular member 14. The tubular member 14 has transverse apertures 26 formed therethrough, as will best be seen in FIGS. 2 and 3.

It is preferable to have wheels 18 of such diameter, so when positioned on a plane surface, such as the bottom of an oil storage tank, will hold the tubular member 14 a spaced distance above the bottom of the tank, however, the tubular member 14 should be in relatively close proximity to the tank bottom.

It is preferable to have the connection 24 threaded internally, to receive a rigid tubular conduit 28, which conduit is one of a series of conduits which are threadably coupled together by couplings 30, so as to form a handle to extend out through opening 6, in the top of tank 1. If desired, an emulsion breaking chemical dispenser, designated generally by the numeral 32, FIGS. 1 and 4, may be attachably connected to the uppermost or the rigid conduits 28, so that the dispenser may be readily regulated, as will be more fully set out hereinafter. The chemical dispenser 32 has a reservoir 34 of sufficient volume to contain the desired amount of chemical. A conduit 36, preferably of a size of the rigid conduit 28, passes longitudinally through a side of the reservoir 34, but is not in fluid communication therewith, which conduit 36 has threaded connections on each end thereof for connection with conduits 28 and with a threaded connection 38 on valve assembly, designated generally by the numeral 40.

A branch conduit 42 extends out from conduit 36 exterior of one end of reservoir 34 and has an angle valve 44 attached thereto. The other opening of the angle valve connection connects with a conduit 46 leads to and is in communication with reservoir 34. A conduit 48, similar to conduit 46, extends outward from the opposite end of reservoir 34 and is connected with one side of a second angle valve 50, the other side of which angle valve connects to a conduit 52, which is similar to conduit 42, which conduit 52 is in communication with conduit 36 exterior of reservoir 34.

The valve assembly 40 has a handle 54 thereon, which is tubular and is covered with a heat insulating material 56 which enables the handling of the rigid conduit mechanism generally designated by the numeral 58, which extends into the tank 1, to be manipulated over the entire bottom of the tank by the operator who holds the handle 54.

The handle 54 is tubular and has a swivel hose connecting element 60 on the end thereof for connection of the hose 62 which is preferably asbestos lined or of other heat resistant material, and which swivel 60 enables the ready manipulation of the rigid conduit mechanism 58 with dexterity. It is preferable to have the handle 54 extending outward at about a forty-five degree angle from the axis of the rigid conduit 28.

The valve assembly 40 is provided with a bleed-off cock 64 which enables the opening of the valve 40 to permit gases to escape out through opening 66 therein, the purpose of which will be more fully described hereinafter. The hose 62 extends to and is connected with an exhaust take-off device 68 by a union connection 70. The body portion 72 of the exhaust take-off device comprises a belled member which is adapted to be of a size for complementary attachment to exhaust pipe 74 by a flexible hose connection 76. It is preferable that the body member 72 have a nipple 78 of comparable size to the exhaust pipe 74 so as to enable the hose 72 to be readily attached to the exhaust pipe 74 by hose clamps 80, which are of conventional quick clamping screw type. The opposite end of body member 72 has a reduced opening 82 therein out through which exhaust gases are normally directed into hose 62. It is preferable that the upper side of the body portion 72 of the exhaust take-off device has a pressure gauge 84 attached thereto and is in fluid communication with the opening within body portion 72.

A further branch outlet 86 extends outward from a side of bottom portion 72 and has a valve seat 88 therein which complementally receives a valve member 90 therein to close the opening when in one position. The branch outlet 86 extends outward and is threaded for a portion of its length, as will best be seen in FIG. 7. A weak spring 92 is telescoped over an upstanding boss 91 on valve 90 so as to hold the valve in guided relation with respect to opening or seat 88 within the further branch outlet 86. A screwthreaded plug 94, having an inwardly extending boss 96 thereon, is screwthreaded into threaded opening 98 so that the spring 92 will complementally surround boss 96 and urge the valve 92 into seating relation with valve seat opening 88. Adjustment means, such as a slot 100, is provided within screwthreaded plug 94 to enable the adjusting of the compression of spring 92 so the valve 90 will open at a predetermined pressure so as to by-pass exhaust gas outward through outlet opening 102. A plug 104 is screwthreaded into threaded opening 98 to close the opening against the entrance of foreign matter.

Any conventional internal combustion engine or other media for supplying hot air or gas may be used for directing hot air, exhaust fumes from internal combustion engines, air or gas into and through the exhaust take-off device 72. For convenience of illustration, a pickup truck 106, having a conventional engine 108 therein, is shown as the source for generating hot gases, such as exhaust gases, from an internal combustion engine.

A modified form of a chemical receiving hopper is shown in FIG. 9, which hopper or funnel is generally designated by the numeral 110 and has a screwthreaded connection 112 on the lower end thereof for connecting to a joint of rigid conduit 28, as will best be seen in FIG. 8. It is preferable that the rigid conduit 28, as heretofore mentioned, as well as in the present instance, be of non-sparkable metal or plastic so as to minimize fire hazard. In fact, it is preferable to have all usable parts of metal or plastic that do not spark or generate static electricity. With the form of the invention as shown in FIGS. 8 and 9, the chemical dispenser as shown in FIG. 4 may be taken off and a quantity of chemical, such as used for breaking down emulsions, may be introduced directly into the bottom of the tank prior to agitation. It is preferable to use this form of the invention for the introduction of a large quantity of chemical into the bottom of the tank; however it may also be used for introducing smaller quantities, if desired.

*Operation*

To treat an oil emulsion or bottom settlings in a tank it would be preferable to assemble the unit from the various components, which are preferably carried in a small carrying case as shown in FIG. 10, into a unit substantially as shown in FIG. 1, with sufficient lengths of rigid conduit 28 so that the conduit will extend to a sufficient distance above the tank 1 to enable the operator, standing on conventional walkway mounted on tank 1, to manipulate the perforated spreader or agitator 12 over the bottom of tank 1. The rubber tires 20 of wheels 18 will be in rolling relation with the bottom of the tank and the angle of the tubular member 20 will be such that the axes of the transverse apertures 26 will be at an acute angle to the bottom of the tank, and with the device so positioned, engine 108 of motor vehicle 106 is started and with the bleed-off cock 64 open the exhaust gases will pass outward through exhaust pipe 74, through exhaust take-off device 68 into hose 62, and with the bleed-off cock 64 open the gases will flow outward therefrom permitting the engine 108 to run and upon idling the engine at the correct speed the operator takes a position on the walkway mounted on the tank, and by gradually closing bleed-off cock 64 the desired amount exhaust gases are forced downward through nipple 38, conduit 36, rigid conduit 28 through threaded connection 24 into perforated tubular member 14, whereupon exhaust gases will be directed outward through apertures 26 on both sides of tubular member 14, whereupon the hot gases from the exhaust manifold will be directed downward to the bottom of the tank into direct contact relation with the bottom settlings in the tank, and intermingling directly therewith to heat the bottom settlings and emulsions by direct contact relation with the hot gases. The hot gases will be directed outward at high velocity, which will cause violent agitation of the bottom settlings, which agitation can be controlled by opening or closing bleed-off cock 64.

The spreader 12 may be rolled back and forth until the entire bottom surface of the tank has been traversed. When desired, chemical can be introduced into conduit 28 by opening valves 44 and 50 a graduated amount, whereupon gaseous pressure will pass into reservoir 34 through conduits 42 and 46 and the emulsion treating chemical will pass out through conduits 48 and 52, which chemical will be fed directly into the oil by the pressure generated by the hot gases passing downward through conduit 28.

Treating a tank of oil containing bottom settlings and emulsions a few minutes, usually not to exceed ten, will break down the emulsions into the respective constituents with the lighter gravity oils, separated from the emulsions and solids, rising upward. In this manner the major portion of the bottom settlings and emulsions are usually recovered in the form of good oil at a saving to the operator.

*Modified Form of Invention*

FIGS. 11 and 12 illustrate a modified form of the invention, wherein the agitation is unidirectional, and wherein a curved shield is provided on the spreader so as to enable moving the bottom settlings or emulsions along the bottom of the tank ahead of the spreader toward the outlet drain opening, while the tank is being cleaned.

The curved plate 121 is adapted to be attached to the spreader element 12 to enable the carrying out of the special function, as set out in the preceding paragraph. The curved plate 121 has a somewhat hooked end portion 122 which engages perforate tubular member 14, which curved plate extends upward and has a bracket 124 secured thereon, which bracket extends upward to a point above threaded connection 24. A friction clip, which is designated generally at 126, is attached to bracket 124 and has curved fingers 128, which curved fingers 128 on the clip 126 complementally engage rigid conduit 28 so the lower side of the fingers 128 will rest on the top end portion of threaded connection 24, which will prevent downward movement of the clip 126 and the plate 121. The curved plate 121 is sufficiently resilient to keep the lower portion of hook 122 in engagement with the perforate tube member 14, and the lower portion of fingers 128 in engagement with the upper face portion of threaded connection 24, which enables ready attachment of the plate without special tools.

It is preferable to have the bracket 124 perforate on one side thereof, as indicated at 130, which perforation 130 receives an end of a safety chain 132 therein. The opposite side of the bracket 124 is perforated as indicated at 134, to receive a hook 136 which is mounted on the opposite end of the chain. This provides a safety feature to prevent the loss of the curved plate 121, should the plate strike an object in the tank, which would normally cause the disengagement of the clip 126 from rigid conduit 28.

It will be evident, from inspection of curved plate 121 and clip 126, that the plate may be readily attached to either side of the spreader 12, depending upon the particular direction which the bottom settlings and emulsions are to be moved. Furthermore, in moving the bottom settlings with plate 121 attached to the spreader 12, in the manner shown in FIGS. 11 and 12, it is desirable to partially open pressure bleed-off cock 64, so the pressure of the gaseous fluid being emitted through perforations 26 is reduced, thereby a gentle pressure will be exerted on the bottom settlings and emulsions to move these ahead of the spreader 12 and curved plate 121, as the wheels 18 roll along the bottom of the tank.

While the invention has been illustrated and described in some detail, it is to be understood that modifications may be made in the minor details of construction and adaptations made to different installations without departing from the spirit of the invention or the scope of the appended claims.

Having thus clearly illustrated and described the invention, what is claimed as new and desired to be secured by Letters Patent is:

1. A manually operable device for agitating and mixing emulsions and the like within a liquid storage tank, which tank has a plane bottom, by the use of a gaseous fluid, including a gaseous fluid supply; which device comprises an elongated tubular member having perforations formed therein, said tubular member having substantially closed ends, a wheel rotatably mounted on each end of said perforate tubular member for rolling action on the plane bottom of said tank and to hold said perforate tubular member a spaced distance above the plane bottom on which said wheels are adapted to roll, a hollow connection connected to a side of said tubular member intermediate the length thereof, a rigid conduit connected to said hollow connection on said perforate tubular member, a flexible conduit connected to the distal end of said rigid conduit to enable movement of said wheeled, perforate tubular member across the plane bottom of said tank by manual manipulation of said rigid conduit to which said perforate tubular member is connected, means connecting said flexible conduit to said gaseous fluid supply, and valve means within the length of one of said conduits to control the supply of gaseous fluid directed into said perforate tubular member.

2. A manually operable device for agitating and mixing emulsions and the like within a liquid storage tank, as defined in claim 1; wherein an internal combustion engine is provided for supplying said gaseous fluid, which gaseous fluid is hot exhaust gases from said internal combustion engine.

3. A manually operable device for agitating and mixing emulsions and the like within a liquid storage tank, as defined in claim 1; wherein a reservoir is mounted on and surrounds one of said conduits, an inlet pipe interconnecting said reservoir and said conduit on the upper side of said reservoir adjacent said source of gaseous fluid, an outlet pipe interconnecting the lower side of said reservoir and said conduit to direct liquid from said reservoir into said conduit, and valve means within said outlet pipe to selectively direct liquid from said reservoir into said conduit.

4. A manually operable device for agitating and mixing emulsions and the like within a liquid storage tank as defined in claim 1; wherein heating means is provided for heating said gaseous fluid being directed into said flexible conduit, and wherein means is provided controlling the maximum pressure of gaseous fluid directed into said conduit leading to said perforate tubular member.

5. A device for agitating and mixing emulsions and the like within a liquid storage tank as defined in claim 4; wherein said means for heating said gaseous exhaust fluid is an internal combustion engine, an exhaust pipe leading from said internal combustion engine, exhaust take-off means attachably secured to said exhaust pipe, connection means on said exhaust take-off means for connecting said flexible conduit thereto, wherein said means for controlling the maximum pressure of gaseous fluid into said conduit is relief valve operatively connected to said conduit leading from said exhaust pipe to said wheeled, perforate tubular member, said relief valve being adjustable to relieve pressure when said exhaust gas within said exhaust pipe and said conduits reaches a predetermined pressure.

6. A device for agitating and mixing emulsions and the like within a liquid storage tank, which tank has a plane bottom, by the use of an exhaust gaseous fluid, including a gaseous fluid supply; which device comprises an elongated tubular member having perforations formed therein, said tubular member having closed ends, a wheel rotatably mounted on each end of said perforate tubular member to hold said perforate tubular member a spaced distance above the plane on which said wheels are adapted to roll, a hollow connection connected to said perforate tubular member intermediate the length thereof, a rigid conduit connected in fluid communication with said hollow connection on said perforate tubular member, a flexible conduit connected to the distal end of said rigid conduit, means connecting said flexible conduit to said gaseous fluid supply, valve means within one of said conduits to control the supply of gaseous fluid directed into said perforate tubular member, a reservoir attached to one of said conduits, which reservoir has a conduit interconnecting each end thereof with said conduit to which said reservoir is attached, a regulating valve positioned in each of said conduits to selectively regulate the flow of exhaust gas into said reservoir and to selectively regulate the passage of liquid from said reservoir into said conduit to which said reservoir is attached simultaneously with the passage of gaseous fluid through said conduit to which said reservoir is attached.

7. A device for agitating and mixing emulsions and the like within a liquid storage tank, which tank has a plane bottom, by the use of a gaseous fluid, including a gaseous fluid supply; which device comprises an elongated tubular member having perforations formed therein, said tubular member having closed ends, a wheel rotatably mounted on each end of said perforate tubular member to hold said perforate tubular member a spaced distance above the plane on which said wheels are adapted to roll, a hollow connection connected to said perforate tubular member intermediate the length thereof, a rigid conduit connected in fluid communication with said hollow connection on said perforate tubular member, a flexible conduit connected to the distal end of said rigid conduit, means connecting said flexible conduit to said gaseous fluid supply, valve means within one of said conduits to control the supply of gaseous fluid directed into said perforate tubular member, which elongated, perforate tubular member has a curved plate attachably connected thereto, means provided on said curved plate to frictionally engage said rigid conduit to frictionally hold said curved plate in such manner that certain of said perforations in said tubular member are unobstructed, but which curved plate is so positioned that other of said perforations in said tubular member will direct the gaseous fluid escaping therefrom against said curved plate to divert the gaseous fluid at an angle with respect to the normal line of discharge from said perforations.

References Cited in the file of this patent

UNITED STATES PATENTS

| | | |
|---|---|---|
| 1,118,041 | Nobel et al. | Nov. 24, 1914 |
| 1,183,004 | Green et al. | May 16, 1916 |
| 1,272,979 | Maitland | July 16, 1918 |
| 1,309,432 | Brownlee | July 8, 1919 |
| 1,814,298 | Dennhardt | July 14, 1931 |
| 2,245,551 | Adams et al. | June 17, 1941 |
| 2,521,397 | Muller | Sept. 5, 1950 |
| 2,677,666 | Dougherty | May 4, 1954 |
| 2,830,957 | Rhodes | Apr. 15, 1958 |
| 2,970,967 | Lowery | Feb. 7, 1961 |
| 2,986,382 | Langdon | May 30, 1961 |
| 2,986,383 | Lowry | May 30, 1961 |

FOREIGN PATENTS

| | | |
|---|---|---|
| 210,083 | Great Britain | Nov. 27, 1924 |